Aug. 26, 1924.    1,506,303
N. M. HOPKINS
FLASH LIGHT
Filed Dec. 20, 1920
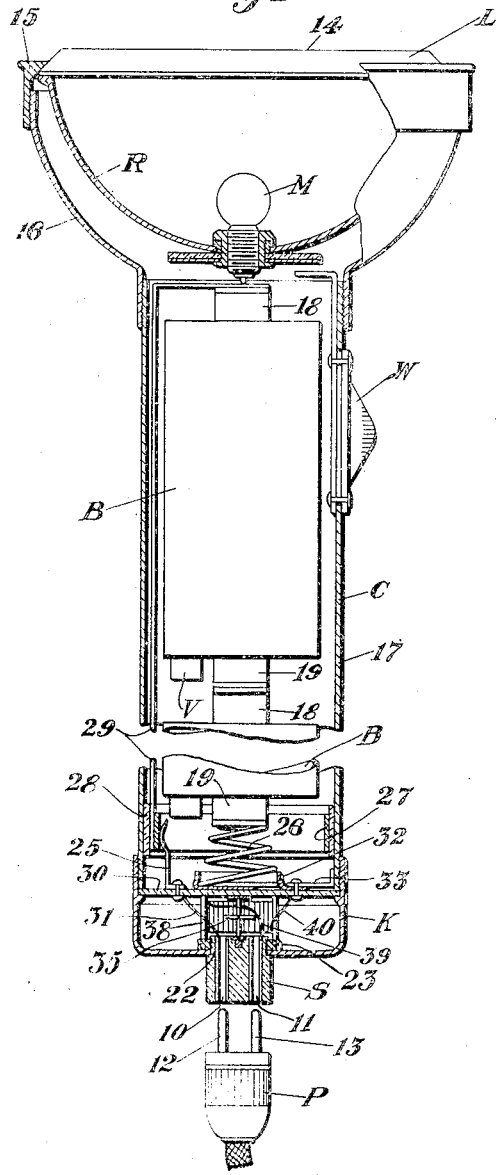
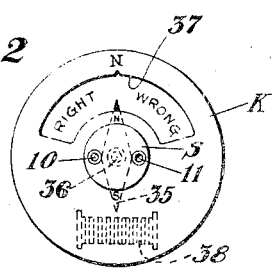
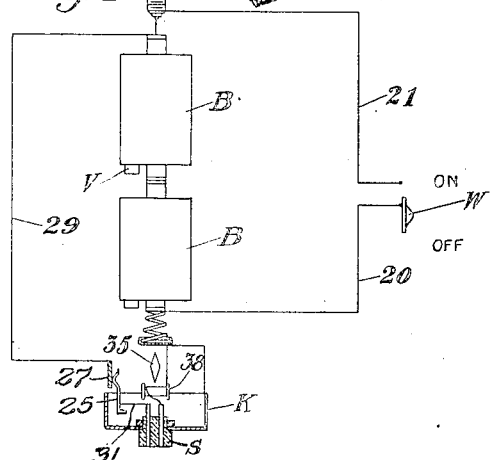
INVENTOR.
Nevil Monroe Hopkins
BY
Byrnes Townsend & Beckenstein
ATTORNEYS Patented Aug. 26, 1924.

1,506,303

UNITED STATES PATENT OFFICE.

NEVIL MONROE HOPKINS, OF NEW YORK, N. Y., ASSIGNOR TO NATIONAL CARBON COMPANY, INC., A CORPORATION OF NEW YORK.

FLASH LIGHT.

Application filed December 20, 1920. Serial No. 432,023.

*To all whom it may concern:*

Be it known that I, NEVIL MONROE HOPKINS, a citizen of the United States, residing at New York city, in the county of New York and State of New York, have invented certain new and useful Improvements in Flash Lights, of which the following is a specification.

This invention relates to flashlights particularly, and generally to portable electric lighting devices embodying miniature rechargeable or storage batteries.

Miniature storage batteries as heretofore employed in conjunction with flashlights have generally been removed from the flashlight casing for connection to a suitable electric circuit to recharge the same. This involves handling the battery, which is objectionable aside from the time and labor required to remove and replace the battery, and it is, therefore, desirable that the storage battery shall be rechargeable while contained in the flashlight casing and yet shall be readily removable therefrom for inspection, repairs or replacement. However, inasmuch as the gassing incidental to charging a storage battery may force liquid electrolyte through the capillary vent of the storage battery if the inlet of the vent is below the level of the electrolyte, it is important that the battery be supported during the charging operation so that the inlet end of the vent is above the level of the electrolyte.

A primary object of this invention is, therefore, to provide an improved flashlight casing so constructed that a charging circuit may be electrically coupled to the battery or batteries therein without opening the casing, but arranged so that the battery may be readily withdrawn and replaced, if desired.

Another important object of the invention is to provide an improved flashlight casing that shall have provision whereby it and the batteries therein, may be readily supported during the charging operation, in a position so that the liquid electrolyte will not leak from the batteries and so that the charging circuit may be conveniently coupled to the part of the charging circuit within the flashlight casing.

Another object of the invention is to provide means whereby the person who charges the battery may readily ascertain whether the charging circuit is properly coupled to the flashlight battery.

The above and other objects and the novel features of this invention will be apparent from the following description taken in connection with the accompanying drawings which form a part of this application and in which—

Fig. 1 is a longitudinal sectional view with parts broken out, illustrating a flashlight embodying this invention, Fig. 2 is a bottom plan view of the flashlight shown in Fig. 1, Fig. 3 is a longitudinal section with parts broken out, of another flashlight embodying this invention, and Fig. 4 is a diagram of the electrical circuits of the flashlight shown in Fig. 1.

Broadly speaking, the essential features of my invention include a cap member K carrying an electrical connector, such as a socket member S of insulating material having conductors 10 and 11 to which the charging circuit may be electrically connected, as by a complementary plug member P carrying the terminals 12 and 13 of a circuit that is electrically connected to a suitable low-voltage direct current electric supply or charging device. The flashlight casing C, which contains one or more miniature rechargeable or storage batteries B, has the cap member K detachably mounted on and closing the rear end thereof, whereby the battery or batteries may be removed and replaced as desired by removing the cap K.

The flashlight casing C may be provided with a suitable base, such as a lens L having a flat outer face 14 secured to the front end thereof in order that the vents V of the storage battery in the casing may be supported with their inlet ends above the liquid electrolyte level, to prevent expulsion of such electrolyte during charging and gassing of the battery. Moreover, when the flashlight is supported on the lens L, the plug member P may be conveniently coupled to the socket member S to charge the battery B. The lens L may be held in place on the casing by the usual lens ring 15 detachably connected as by screw threads to the enlargement 16 which in turn is also suitably connected as by screw threads to the front end of the main tubular casing part 17. The casing members 16, 17 and cap K may be of any suitable material and as here illustrated, are of light metal. The reflector R and the miniature incandescent lamp M mounted at its focus, are also held in place in the enlargement 16 by the lens ring 15. The miniature storage batteries employed may be of any suitable construction and as shown, have positive and negative terminal posts 18 and 19 at opposite ends thereof, whereby the batteries may be readily connected in series with each other and with the lamp M by the usual switch W thru conductors 20 and 21, as indicated in Fig. 4.

The cap K may be provided with screw threads or other means whereby it may be detachably mounted on the tubular casing member 17 to close the open rear end thereof. The electrical connector or socket member S may be of any suitable type and as shown, consists of an insulating plug held in place in an opening 22 through the top of the cap, by a nut 23 which is connected by screw threads to the insulating plug and bears against the inside wall of the cap. The metal conductors 10 and 11 of the socket member S, as shown, are hollow sockets adapted to receive the terminals 12 and 13 carried by the plug P which are in the form of pins adapted to snugly fit into the sockets 10 and 11.

Suitable means are adapted to electrically connect the conductors 10 and 11 in circuit with the batteries B when the cap is in place on the casing member 17. As shown, spring contact members 25 and 26, electrically connected to the conductors 10 and 11, are respectively adapted to engage the conducting ring 27 and a terminal 19 of a storage battery when the cap is secured to the casing. The conducting ring 27 is insulated from the case as by an insulating ring 28 and is electrically connected to a terminal 18 of the battery as by a conductor 29. The ring 27 is engageable by the end of the conducting finger 25, in any position of the cap on the casing, the said finger being rigidly mounted on an insulating disc 30 secured in the cap K, and connected to the socket conductor by a conductor 31. The helical conducting spring 26, the free end of which is adapted to engage the bottom battery terminal 19, is secured at one end in a conducting cup 32 mounted on the insulating disc 30. The cup 32 is electrically connected to the metal casing member 17 by a conductor 33 that is adapted to engage the inner wall of the casing in any position of the cap and is also electrically connected to the other socket conductor 11 by means presently to be described. The spring 26 serves the two-fold function of a cushioning device for the batteries and also as a means for conducting charging current thereto.

Inasmuch as the pins 12, 13 as well as the sockets 10, 11, are substantially similar, it is necessary to see that the plug and socket are so coupled together that the charging current flows in the proper direction to the battery. Accordingly, a polarity indicating means is provided whereby the operator is informed by a suitable visible indicating device whether the right or wrong connections have been made. As illustrated, a magnetic needle 35 is pivoted by a staff 36 between bearings carried by the disc 30 and the inner end of the insulating socket member S. The north pole of the needle 35 is visible through a window 37 which is provided at opposite ends with suitable indicating markings such as "right" and "wrong," whereby, when the flashlight is properly positioned and the plug and socket members are coupled together, the operator may readily ascertain whether the current in the charging circuit is flowing in the proper direction through the battery or batteries to charge the same. A coil 38 mounted in the cap K between the insulating disc 30 and the top of the cap is connected in the charging circuit as by conductors 39 and 40, respectively connected to the socket conductor 11 and the cup conductor 32. The coil 38 is arranged adjacent the needle 35 so that the field set up by the flow of current therethrough will affect the needle to swing it in one direction or the other, depending on whether the pins 12, 13 and sockets 10, 11 have been properly or improperly connected.

The indicating device illustrated in Figs. 1 and 2 may be omitted from some forms of portable lighting devices, as shown for example, in Fig. 3, in which the socket conductors 10' and 11' are dissimilar in size or shape to respectively receive dissimilar pins 12' and 13' of the plug member P'. By suitable means such as an indicating device on the charging apparatus, the polarity of the terminal pins 12' and 13' is always the same and inasmuch as these pins may be inserted in only one way into the socket conductors 10' and 11' respectively, the proper direction of current to the battery in the flashlight casing is assured. In the flashlight shown in Fig. 3, the cup 32' is directly connected to the inner end of the socket conductor 11', as by screw threads or soldering and the insulating disc 30' is held in position adjacent the top of the cap K' by the nut 23' which also holds the socket member S' on the cap. An additional insulating disc 30'' may be provided to insulate conducting parts from the cap. Otherwise, the flashlight shown in Fig. 3 is substantially similar in construction and operation to the one shown in Figs. 1 and 2.

The manipulation and operation of the flashlights described will be apparent from the drawings and the foregoing description. While the herein disclosed embodiments of the invention have been described in detail, it is to be understood that the principles set forth may be applied to other types of portable electric lighting devices without sacrificing the advantages of the invention, and the invention is, therefore, not limited to the exact constructions illustrated.

I claim:

1. A flashlight comprising in combination a tubular casing member, a rechargeable battery in said casing member, an electric lamp in circuit with said battery, means mounted on and closing one end of said member, a cover normally closing the other end of said member, a switch in circuit with said lamp and battery, an insulating device extending through said cover, and electrical terminals carried by said device, connected in circuit with said battery and adapted to be coupled to an electric supply circuit for charging said battery.

2. A portable electric light comprising in combination, an electric lamp, a storage battery in circuit therewith, a casing for said lamp and said battery having a cover normally closing one end thereof and removable independent of said lamp and battery, electric terminals carried by said cover and connected in circuit with said battery when said cover is in place on said casing, and electrically operable indicating means carried by said cover adapted to indicate whether the terminals on the cover have been correctly or incorrectly connected to a supply circuit for charging said battery.

3. A portable electric lighting device comprising in combination, an electric lamp, a storage battery in circuit therewith, a casing for said lamp and said battery having a removable cover provided with a window, electric terminals carried by said cover and connected in circuit with said battery when said cover is in place on said casing, and indicating means carried by said casing comprising a magnetic needle visible through said window and a coil associated with said magnetic needle and in circuit with said battery.

4. A flashlight comprising in combination, an electric lamp, a storage battery in circuit therewith, a casing for said lamp and said battery having a detachable cap, electric terminals carried by said cap but insulated therefrom and connected in circuit with said battery, such terminals comprising sockets adapted to receive pin terminals electrically connected to a source of current for charging said battery, a coil in said cap in circuit with said battery, and a needle in said cap associated with said coil and visible through a window of the cap to indicate whether said pin terminals have been correctly or incorrectly connected to said socket terminals to supply current in the proper direction to charge said storage battery.

5. A portable electric lighting device comprising in combination, an electric lamp, a battery in circuit therewith, a casing for said lamp and said battery having a removable cover, electric terminals carried by said cover and accessible from the exterior thereof, and means adapted to connect said terminals in circuit with said battery comprising a conducting finger and a central conducting spring.

6. A portable electric lighting device comprising in combination, an electric lamp, a rechargeable battery adapted to supply current to said lamp and having its base adjacent said lamp, and a vent at its opposite end for the escape of gases produced during charging of the same, a casing enclosing said lamp and said battery and including means adjacent said lamp adapted to serve as a base to support the lighting device with the inlet of the vent above the level of the electrolyte in the battery to avoid leakage of such electrolyte during charging.

7. A portable electric lighting device comprising the combination of an electric lamp, a storage battery in circuit therewith and having a gas vent and a casing for said lamp and said battery comprising a lens adapted to support the device upon a flat or substantially level surface with the battery and its vent disposed so that substantially no liquid electrolyte may leak therefrom during the gassing incidental to charging.

8. A portable electric lighting device comprising in combination, an electric lamp, a storage cell in circuit therewith, said cell having electrical terminal means at its end adjacent said lamp and a vent at its opposite end, and means in front of said lamp having an outer surface adapted to serve as a level base to support said device during charging with the cell thereof in upright position and said vent at the upper end.

9. A flashlight comprising in combination an electric lamp, a storage cell in circuit therewith having one end adjacent said lamp and a vent at its opposite end, and a casing for said lamp and cell comprising a lens having a flat outer side adapted to serve as a base for supporting said flashlight upon a level surface with said cell in upright position and the vent thereof at the upper end.

10. A flashlight comprising in combination, an electric lamp, a storage battery adapted to supply current to said lamp and having its base adjacent said lamp and a gas vent at its opposite end, and a casing enclosing said lamp and said battery and including a lens in front of said lamp having a flat outer face whereby said flashlight may be supported on said lens as a base to maintain said vent substantially uppermost with its inlet end above the level of the electrolyte of the battery to avoid leakage of the electrolyte therefrom during the gassing incidental to charging.

11. A flashlight comprising in combination a tubular casing member, an electric lamp mounted on one end of said casing member, a storage cell in said casing member having terminal means adjacent one end in circuit with said lamp and having a vent at its opposite end, means adjacent said lamp having an outer face adapted to serve as a base for supporting the flashlight upon a level surface, a cover normally closing the other end of said casing member, and electrical terminal means carried by said cover, connected in circuit with said cell and adapted to be electrically coupled to an electrical supply circuit for charging said cell.

12. A flashlight comprising in combination, an electric lamp, a rechargeable battery connected in circuit with said lamp, a casing enclosing said lamp and said battery comprising a cover detachably secured to one end thereof and a lens mounted in front of said lamp at the other end thereof, said lens having a flat outer surface whereby said flashlight may be supported on said lens as a base, and electrical terminals carried by said cover connected in circuit with said battery when said cover is in place and adapted for connection to a source of electric current for charging said battery.

13. A flashlight comprising in combination, an electric lamp, a storage battery connected in circuit with said lamp, a casing enclosing said lamp and said battery and including a cap detachably connected to one end thereof, a lens mounted on the other end in front of said lamp and having a flat outer surface whereby said flashlight may be supported on said lens as a base, electrical terminals carried by said cap and accessible from the exterior thereof and adapted to be connected in circuit with said battery when said cap is in place on said casing, said terminals being adapted for connection to a source of electric current for charging said battery, and indicating means carried by said cap for indicating whether said source of current has been correctly or incorrectly connected to said electrical terminals.

In testimony whereof, I affix my signature.

NEVIL MONROE HOPKINS.